US008816903B2

(12) United States Patent
Sengupta et al.

(10) Patent No.: US 8,816,903 B2
(45) Date of Patent: Aug. 26, 2014

(54) METHOD AND APPARATUS FOR FASTER GLOBAL POSITIONING SYSTEM (GPS) LOCATION USING A PRE-COMPUTED SPATIAL LOCATION FOR TRACKING GPS SATELLITES

(75) Inventors: Uttam Sengupta, Portland, OR (US); Sanjay Bakshi, Beaverton, OR (US); Shriharsha Hedge, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 306 days.

(21) Appl. No.: 13/332,236

(22) Filed: Dec. 20, 2011

(65) Prior Publication Data

US 2012/0112961 A1 May 10, 2012

Related U.S. Application Data

(63) Continuation of application No. 12/060,218, filed on Mar. 31, 2008, now Pat. No. 8,085,190.

(51) Int. Cl.
*G01S 19/48* (2010.01)
*G01S 19/23* (2010.01)

(52) U.S. Cl.
USPC ................................. 342/357.31; 342/357.62

(58) Field of Classification Search
USPC ............ 342/357.23, 357.31, 357.46, 357.62, 342/357.71; 701/468, 469
See application file for complete search history.

(56) References Cited

U.S. PATENT DOCUMENTS

| 7,043,258 | B2 | 5/2006 | Haddrell | |
|---|---|---|---|---|
| 7,561,101 | B1 * | 7/2009 | Tester et al. | 342/357.77 |
| 8,085,190 | B2 * | 12/2011 | Sengupta et al. | 342/357.31 |
| 2002/0154058 | A1 | 10/2002 | Pande et al. | |

(Continued)

FOREIGN PATENT DOCUMENTS

| TW | 200711387 | 3/2007 |
|---|---|---|
| TW | 200717010 | 5/2007 |
| TW | 200722780 | 6/2007 |
| WO | WO-2006/118494 | 11/2006 |

OTHER PUBLICATIONS

Notice on the Second Office Action dated Mar. 22, 2012 (+ English summary), in Chinese Patent Application No. 200810168865.3, 9 pages.

Office Action (+ English translation), with a response deadline of Dec. 24, 2012, in Taiwan Patent Application No. 098110509, 19 pages.

(Continued)

*Primary Examiner* — Dao Phan
(74) *Attorney, Agent, or Firm* — Blakely, Sokoloff, Taylor & Zafman LLP

(57) ABSTRACT

A method and apparatus for faster global positioning system (GPS) location using pre-computed spatial location data are described. In one embodiment, a method includes acquiring a pre-computed spatial location of a mobile platform device (MPD) that is computed when a GPS receiver is disabled due to the spatial location of the MPD. In one embodiment, the pre-computed spatial location is determined by a non-GPS based spatial location technology when a receiver is disabled due to the spatial location of the MPD. During the periodic computation of spatial location data, the GPS receiver may be monitored. In one embodiment, in response to activation of the GPS receiver, the pre-computed spatial location data is provided to the GPS receiver for identification and lock onto a predetermined number of visible satellites to reduce a time to first fix (TTFF) a current spatial location of the MPD. Other embodiments are described and claimed.

19 Claims, 5 Drawing Sheets

(56) References Cited

U.S. PATENT DOCUMENTS

| | | |
|---|---|---|
| 2006/0036365 A1 | 2/2006 | Chiayee et al. |
| 2006/0038719 A1 | 2/2006 | Pande et al. |
| 2007/0010261 A1 | 1/2007 | Dravida et al. |
| 2007/0042790 A1 | 2/2007 | Mohi et al. |
| 2007/0072623 A1 | 3/2007 | Shyr et al. |
| 2007/0248355 A1 | 10/2007 | Lee |
| 2008/0117103 A1 | 5/2008 | Wang et al. |
| 2008/0191933 A1 | 8/2008 | Wigren et al. |
| 2009/0054075 A1* | 2/2009 | Boejer et al. ............... 455/456.1 |

OTHER PUBLICATIONS

Office Action for U.S. Appl. No. 11/864,817 mailed Nov. 24, 2009.
Final Office Action for U.S. Appl. No. 11/864,817 mailed May 26, 2010.
Non-Final Office Action for U.S. Appl. No. 12/060,218 mailed Mar. 2, 2011.
First Office Action for Chinese Patent Application No. 200810168865.3 mailed Feb. 23, 2011.
Gong, Guo-Hui, et al., "Research and Design of Software GPS Positioning Component", Computer Applications, vol. 25, No. 12, (Dec. 31, 2005), 2938-2939.

* cited by examiner

METHOD AND APPARATUS FOR FASTER GLOBAL POSITIONING SYSTEM (GPS) LOCATION USING A PRE-COMPUTED SPATIAL LOCATION FOR TRACKING GPS SATELLITES

PRIORITY CLAIM

This continuation application is related to, and claims priority to, U.S. patent application Ser. No. 12/060,218, entitled "METHOD AND APPARATUS FOR FASTER GLOBAL POSITIONING SYSTEM (GPS) LOCATION USING A PRE-COMPUTED SPATIAL LOCATION FOR TRACKING GPS SATELLITES filed on Mar. 31, 2008, now issued as U.S. Pat. No. 8,085,190, which is hereby incorporated by reference herein as though set forth in full.

FIELD

Some embodiments relate to a method and apparatus for faster global positioning system (GPS) location using a pre-computed spatial location for tracking GPS satellites,

BACKGROUND

Mobile computing systems, such as laptop computers, notebook computers and handheld devices (e.g., personal digital assistants, cell phones, etc.) are often battery-powered; and, as such, power consumption is a matter of concern. Hence, mobile computing systems are limited to a run-time dictated by the life of a battery used by the respective device. A typical laptop's battery lasts about 5-8 hours. However, depending on the complexity of the mobile platform, the respective mobile platform can deplete power resources from an attached battery within a relatively short amount of time.

Today, many mobile devices are capable of entering a low power ("Sleep/Stand-by/Hibernate") state to conserve battery power when not in active use. To conserve battery power, an individual either places his/her mobile device in the Standby/Hibernate state, or the device itself, if left idle, enters the state. Use of GPS and location based services is becoming a key usage model on mobile devices such as notebooks, UMPCs (Ultra Mobile PCs) and Mobile Internet Devices (MIDs). Unfortunately, a GPS receiver of a UMPC/MID system may be subject to a cold restart due to deactivation for power saving when GPS signals are weak.

BRIEF DESCRIPTION OF THE DRAWINGS

The various embodiments of the present invention are illustrated by way of example, and not by way of limitation, in the figures of the accompanying drawings and in Which.

DETAILED DESCRIPTION

Figure 1:
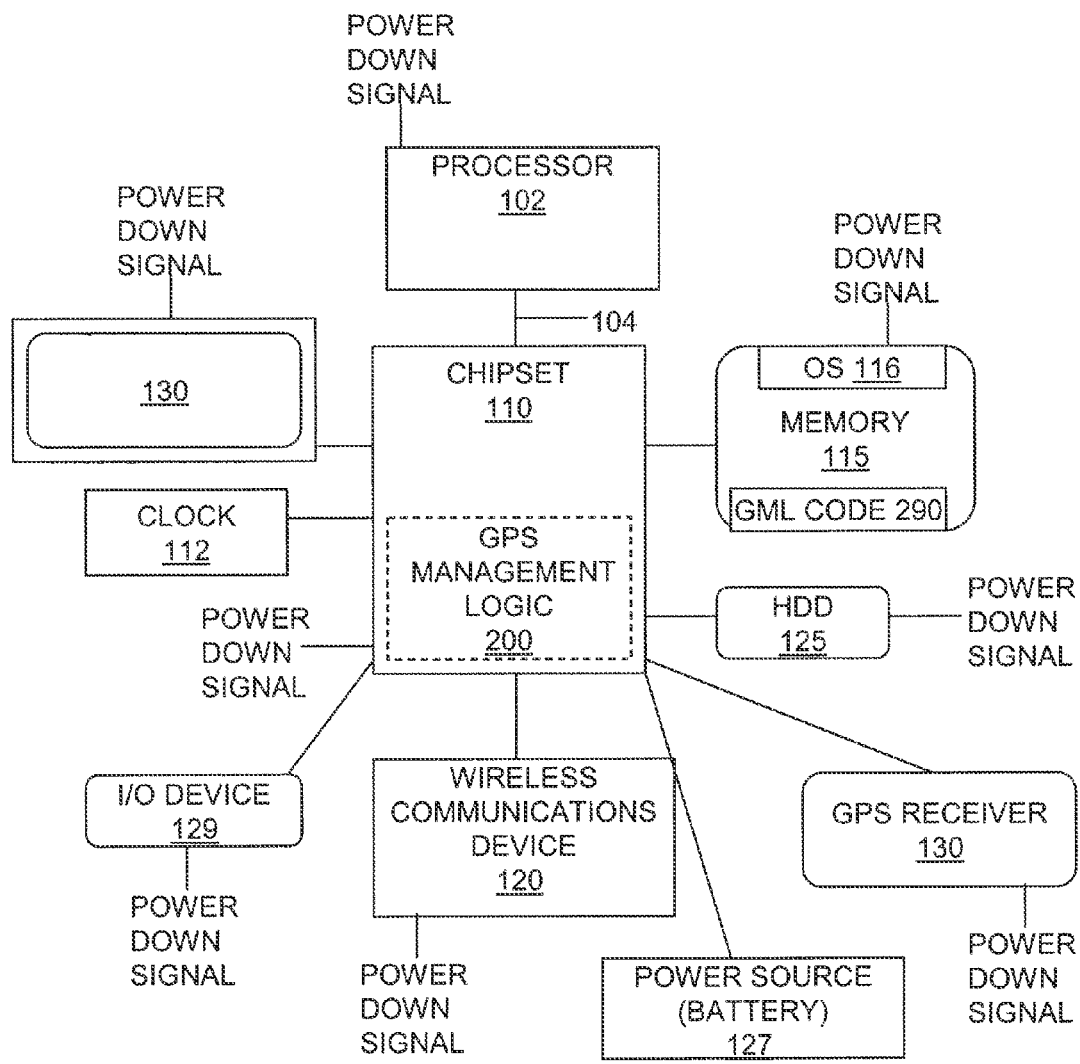
FIG. 1 is a block diagram illustrating a mobile personal computer (MPC) system including global positioning system (GPS) management logic to enable faster GPS location using a pre-computed spatial location of the MPC system, in accordance with one embodiment.

In general, a method and apparatus for faster global positioning system (GPS) location, using a pre-computed spatial location for tracking GPS satellites, are described. In one embodiment, a method includes periodic calculation of a spatial location of a mobile platform device (MPD) according to a spatial location technology that can pre-compute the spatial location when a GPS receiver is disabled due to the spatial location of the MDP. In one embodiment, the pre-computed spatial location of the MPD is determined according to a non-GPS based spatial location technology (logic). During the periodic calculation of the pre-computed spatial location, the GPS receiver may be monitored. In one embodiment, in response to activation of the GPS receiver, the pre-computed spatial location is provided to the GPS receiver to expedite the tracking of GPS satellites. In one embodiment, the pre-computed spatial location expedites identification and lock onto a predetermined number of visible satellites to reduce a time to first fix (TTFF) a current spatial location of the MPD.

In one embodiment, the term "pre-computed spatial location" may include, for example, the location of a mobile platform device or MPD, according to the described embodiments, that is computed without the use of a GPS signal referred to herein as "non-GPS based spatial location," As described herein, "non-GPS based spatial location logic" may pre-compute the spatial location using a wireless technology standard, such as the wireless (LAN) (WLAN) 802.11 network, TV signals or the like to enable precise and efficient acquisition of required information for detecting the satellites that are visible and overhead of a geographic location or geo. By reducing search time, power saving is also achieved by the MPD.

In one embodiment, a non-GPS based location is computed according to a wireless communication protocol to provide faster GPS location using an indoor spatial location technologies for expediting the tracking of GPS satellites. In one embodiment, a faster, efficient satellite search by the GPS receiver is described where the pre-computed spatial location is provided to the GPS receiver to establish a current spatial location of the MPD if the GPS receiver is in a disabled state for more than a predetermined period of time, such as, for example, 30 minutes.

In the following description, numerous specific details such as logic implementations, sizes and names of signals and buses, types and interrelationships of system components, and logic partitioning/integration choices are set forth to provide a more thorough understanding. It will be appreciated, however, by one skilled in the art that the embodiments described may be practiced without such specific details. In other instances, control structures and gate level circuits have not been shown in detail to avoid obscuring the embodiments described. Those of ordinary skill in the art, with the included descriptions, will be able to implement appropriate logic circuits without undue experimentation.

In the following description, certain terminology is used to describe the various embodiments. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

FIG. 1 is a block diagram illustrating mobile personal computer (PC) (MPC) or mobile platform device (MPD) system 100 including GPS management logic 200 to enable faster GPS location using pre-computed spatial location data of MPC system 100, in accordance with one embodiment. As described herein, an "MPC system" may include, but is not limited to, laptop computers, notebook computers, handheld devices (e.g., personal digital assistants, ultra-mobile devices, cell phones, etc.), or other like battery powered devices.

Representatively, MPC system 100, which may be referred to herein as a "mobile platform architecture," comprises a processor system interconnect 104 for communicating information between processor (CPU) 102 and chipset 110. In one embodiment, CPU 102 may be a multi-core processor to provide a symmetric multiprocessor system (SMP) a chip multiprocessor system (CMP) or other like multi-core processor configuration. As described herein, the term "chipset" or "chip" is used in a manner to collectively describe the various devices coupled to CPU 102 to perform desired system functionality.

Representatively, display 130, wireless communication device 120, hard drive devices (HDD) 125, main memory 115, clock 112, input/output (I/O) device 129 and direct current (DC) power source (battery) 127 may be coupled to chipset 110 to supply DC voltage to MPC system 100. Although shown as HDD 125, one of ordinary skill in the art would appreciate, based at least on the teachings described herein, that Solid State Drives (SSD) and other storage devises may also be used. In one embodiment, chipset 110 is configured to include a memory controller hub (MCH) and/or an I/O controller hub (ICH) to communicate with I/O devices, such as wireless communications device 120. In an alternate embodiment, chipset 110 is or may be configured to incorporate a graphics controller and operate as a graphics memory controller hub (GMCH). In one embodiment, chipset 110 may be incorporated into CPU 102 to provide a system on chip.

In one embodiment, main memory 115 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data. Representatively, computer system 100 further includes non-volatile (e.g., Flash) memory 224 (shown in FIG. 2). In one embodiment, flash memory may be referred to as a "firmware hub" or FWH, which may include a basic input/output system (BIOS) that is modified to perform, in addition to initialization of computer system 100, initialization of GPS management logic 200 to enable faster GPS location using pre-downloaded assistance data for MPC system 100, according to one embodiment.

MPC/MPD systems, such as MPC system 100, laptop computers, notebook computers, Ultra Mobile PCs, Mobile Internet Devices, Smart Phones, handheld devices (e.g., personal digital assistants, cell phones, etc.) are often battery powered; and, as such, power consumption is a matter of concern. Examples of mobile computing devices, such as MPC system 100, may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

In one embodiment, GPS management logic (GML) 200 periodically calculates a spatial location of a mobile platform device (MPD) when a GPS receiver is disabled due to the spatial location of the MPD according to data non-GPS spatial location technology such as an indoor spatial location technology. In one embodiment, GML 200 may also periodically capture GPS assistance data using a wireless network connection to a GPS assistance server. In one embodiment, GPS management logic 200 provides an automated mechanism for faster GPS location using a pre-computed spatial location data for tracking GPS satellites.

GPS is a satellite based positioning technology. Satellites in the sky timely continually send information at a low-bit rate. GPS receivers need to receive signals from at least 3 satellites to calculate a horizontal position. A fourth satellite is necessary for altitude calculation and time correction. GPS receivers search for satellites in the sky. After finding the satellites, conventionally, boot strap data, i.e., precise orbital data and clock corrections for each of those satellites is downloaded. In conventional systems, it is only after acquisition of boot strap data that the receiver knows where the satellites are and uses triangulation algorithms to calculate its position. This boot strap data is downloaded at a low-bit rate directly impacting the TTFF.

Global Positioning System (GPS) receivers need to search for GPS satellites in the sky and receive data from those satellites before calculating position. When the mobile platform does not know its approximate position, it has to search for all the satellites in the sky. This operation could take as much as 1-2 minutes. If the mobile platform knows its approximate position, then it may search for a reduced number of satellites that are visible over a geographic-location. In one embodiment, a pre-computed spatial location is provided, as an approximate position to help GPS receiver on a mobile platform achieve faster time to first fix (TTFF) by detection and lock onto the visible satellites over a geo. In one embodiment, an indoor location technology may operate as the non-GPS based location logic to enable computation of a spatial location from Wi-Fi based beacon location or TV signals to enable precise and efficient way of getting the required information for detecting the satellite present over a geo. This will also result in saving power for mobile platforms.

As described herein, in one embodiment, the term "pre-computed, spatial location" may include, for example, an indoor location of a mobile platform device or MPD according to the described embodiments that is computed from a wireless technology standard, such as the wireless line 802.11 standard, TV signals or the like to enable precise and efficient acquisition of required information for detecting the satellites that are visible and overhead of a geographic location or geo. In one embodiment, a non-GPS based location is described according to a wireless communication protocol to provide faster GPS location using indoor location technologies for tracking GPS satellites.

In one embodiment a non-GPS based location logic may include Wi-Fi beacon-based location. Wi-Fi (WLAN 802.11) technology, for example, is a wireless local area network solution that has become ubiquitous in recent years. Wi-Fi technology consists of a small fixed device called an Access Point (AP) that is at the edge of the wired network (Internet).

The AP also has a Wi-Fi radio with which it can transmit and receive data. Mobile clients such Notebook PCs, MIDs and PDA use their Wi-Fi radios to connect to the AP and communicate with the Internet. Wi-Fi beacon-based location is an example of an indoor location technology that does not use GPS. Other GPS-less location technologies include Wi-Fi Precision Location and TV signal based location.

APs generally transmit small messages known as beacons periodically for clients (e.g., MPD 100) to find the AP. Presuming an AP density inside enterprise buildings and urban areas is sufficient, the client can usually see beacons from multiple APs inside enterprise buildings and urban areas. In one embodiment, the client knows location information for some or all of the APs it is detecting to enable calculation its own position. Alternatively, the client uses the strength of the signal received from an AP as a course measure of distance between the client and the AP. In one embodiment, the location of the APs usually comes from a database of AP to position mappings either stored inside the client or on a server in the network.

In one embodiment, a non-GPS based location logic may also include television (TV) signal based location. In one embodiment, MPD 100 may include a TV tuner that may receive a synchronization signal from a television tower. In one embodiment, the non-GPS based location logic may determine a spatial location of the MPD using television signals from multiple television towers.

Hence, GPS receivers, such as GPS receiver 130 as shown in FIG. 1, need to search for GPS satellites in the sky and get boot strap data from those satellites before calculating position (spatial location). In one embodiment, GPS management logic enables GPS receiver 130 to achieve a faster time to first fix or TTFF by obtaining the pre-computed spatial location prior to GPS search for visible satellites. As described herein, the term "an efficient satellite search" minimizing an amount of time from turning on (or activating) a GPS receiver until at least three satellites are acquired and the position is fixed. As known to those skilled in the art, a UPS receiver calculates its position by measuring the distance between itself and 3 or more GPS satellites.

Measuring the time delay between transmission and reception of each GPS microwave signal gives the distance to each satellite, since the signal travels at a known speed. These signals also carry information about the satellite's location and general health, referred to herein as "boot strap data" which is known as almanac and ephemeris data. By determining the position of and distance to at least 3 satellites, a GPS receiver can compute its position using, for example, trilateration. Accordingly, in one embodiment, GPS management logic 200 provides a faster TTFF while at the same time consuming lower power, which leads to longer battery life. The longer battery life leads to an improved end-user experience by removing the delay associated with restart of a GPS receiver to provide location capability. Although shown as part of chipset 110, GPS management logic (GML) 200 may be wholly or partially implemented in any of chipset 110, operating system (OS) 116 or as GML code 290 of memory 115.

Figure 2:
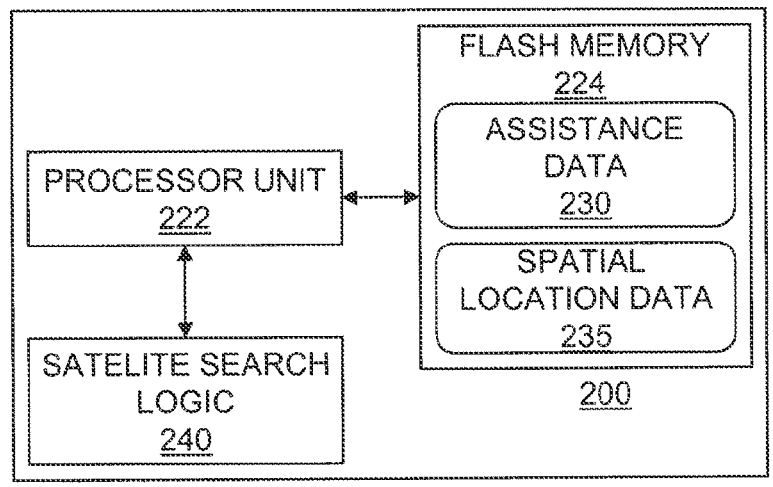
FIG. 2 is a block diagram further illustrating GPS management logic of FIG. 1, according to one embodiment.

FIG. 2 is a block diagram, further illustrating GPS management logic 200, as shown in FIG. 1. Representatively, GPS management logic may include a processor unit 222, which computes a current spatial location of a MPC 100, using pre-computed spatial location data as well as assistance data, such as ephemeris data and almanac data to establish or fix a position of the MPC 100. In one embodiment, GPS code 290, as shown in memory 115 of MPC system 100 of FIG. 1, may periodically determining a spatial location of a mobile platform device (MPD) using wireless communications device 120.

Representatively, GPS code 290 may store pre-computed spatial location data 235 as well as assistance data, such as assistance data 230, as shown in FIG. 2, and provide notification to GPS receiver 130 to turn on the GPS receiver, for example, in response to detection of a navigation message from a GPS satellite. In one embodiment, GPS management logic 200 in combination with satellite search logic 240 and/or GPS code 290, are not limited to computing spatial location data and capturing of assistance data when a GPS module is turned off.

Hence, GPS receiver 130 uses almanac and ephemeris data from satellites to fix a spatial location of the MPC system. Almanac data is the course orbital parameters for all GPS satellites that are part of the constellation. Each satellite broadcasts the almanac data for all satellites, which usually remains valid for several days. Ephemeris data is very precise orbital data and clock correction for each of the satellites necessary for position calculation. Each satellite generally broadcasts its ephemeris data every 30 seconds. Ephemeris data is only valid for about 30 minutes. Accordingly, in one embodiment, satellite search logic 240 is provided to periodically acquire assistance data 230, including, almanac and ephemeris data.

Figure 3:
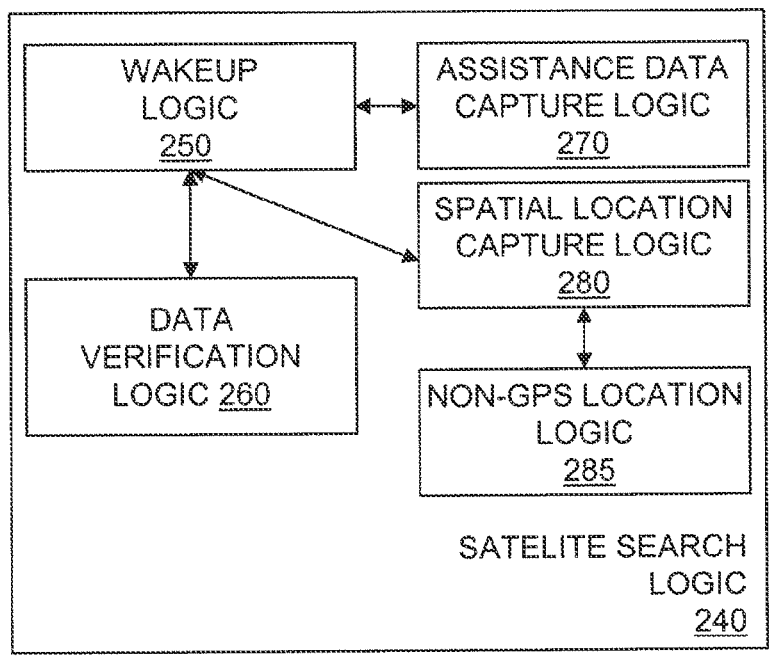
FIG. 3 is a block diagram further illustrating satellite search logic of the GPS management logic of FIG. 1, according to one embodiment.

FIG. 3 further illustrates satellite search logic 240 as shown in FIG. 2, according to one embodiment. Representatively, wake up logic 250 may determine when the GPS is turned on. In one embodiment, when GPS is turned ON, first it has to search for satellites in the sky. In one embodiment, the GPS receiver determines its own approximate location according to the pre-computed spatial location and uses the Almanac data to identify which satellites are possibly located overhead and search for only those satellites, Otherwise, the search could take longer as it may have to search for all the satellites. In one embodiment, several seconds of delay at startup are avoided if the GPS receiver knows its approximate location according to the pre-computed spatial location.

In one embodiment, MPC 100 may be connected to the Internet via a wired or wireless technology, using for example, wireless communications device 120, as shown in FIG. 1. Referring again to FIGS. 2 and 3, when GPS signals are weak, such as when MPC 100 is inside an enterprise office building, it is usually in the vicinity of Wireless access points. In one embodiment, calculation of an approximate spatial location is provided by spatial location capture logic 280 and stored in flash memory 224 as spatial location data 235, as shown in FIG. 2. In one embodiment, based on the detection of periodically transmitted beacon messages from the access points of one or more wireless network connections, non-GPS location logic 285 may determine the location of one or more detected access points or APs. The AP location may be based on predetermined locations of the AP or by, for example, by using the strength of a received signal as a coarse measurement of distance between the client and the AP. In one embodiment, the location of the APs may come from the database of AP to position mappings that is either stored inside the client or on a server network.

In one embodiment, non-GPS location logic 285 may use triangulation algorithms to calculate its position based on a location of a predetermined number of detected access points. In one embodiment, spatial location capture logic 280 may calculate its position by measuring the distance between itself and three or more detected access points of a plurality of wireless network connections. In the embodiments described, the spatial location capture logic 280 periodically directs non-GPS location logic 285 to calculate the spatial location within, for example, an indoor location, such as a building and updates spatial location data 235 which is stored in flash memory 224, shown in FIG. 2.

Accordingly, when activation of the GPS receiver detected, spatial location data 235 is used to expedite the location of visible overhead satellites to expedite identification and lock on to a predetermined number of satellites and reduce a time to first fix or TTFF the current spatial location of MPC system 100. In one embodiment, position information from location technologies on a mobile platform device other than GPS, such as WiFi beacon-based location technology, may be used for GPS initialization to provide efficient satellite search to reduce a time to first fix of a current spatial location of a mobile platform device. As described herein, a "wake up event" may refer to the detected activation of GPS receiver 130.

In one embodiment, wake up logic 250 may activate GPS receiver 130, as shown in FIG. 1 in response to detection of a navigation message outside a building. Once outside the building, although the wireless network connection for the client to the Internet is lost, TTFF will be improved over traditional GPS because an amount of time required identify and lock onto a predetermined number of visible satellites to capture ephemeris data from visible satellites is avoided. The pre-computing of spatial location data can be made more efficient, in one embodiment, by configuring GPS management logic 200 to compute the spatial location data less frequently during the day and more frequently at the end of the day during regular work at the office days. Procedural methods for implementing one or more of the embodiments are now described, Operation Turning now to FIG. 4, the particular methods associated with various embodiments are described in terms of computer software and hardware with reference to a flowchart. The methods to be performed by a computing device may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments are not described with reference to any particular programming language. It will be appreciated that a variety of programming languages may be used to implement embodiments as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Figure 4:
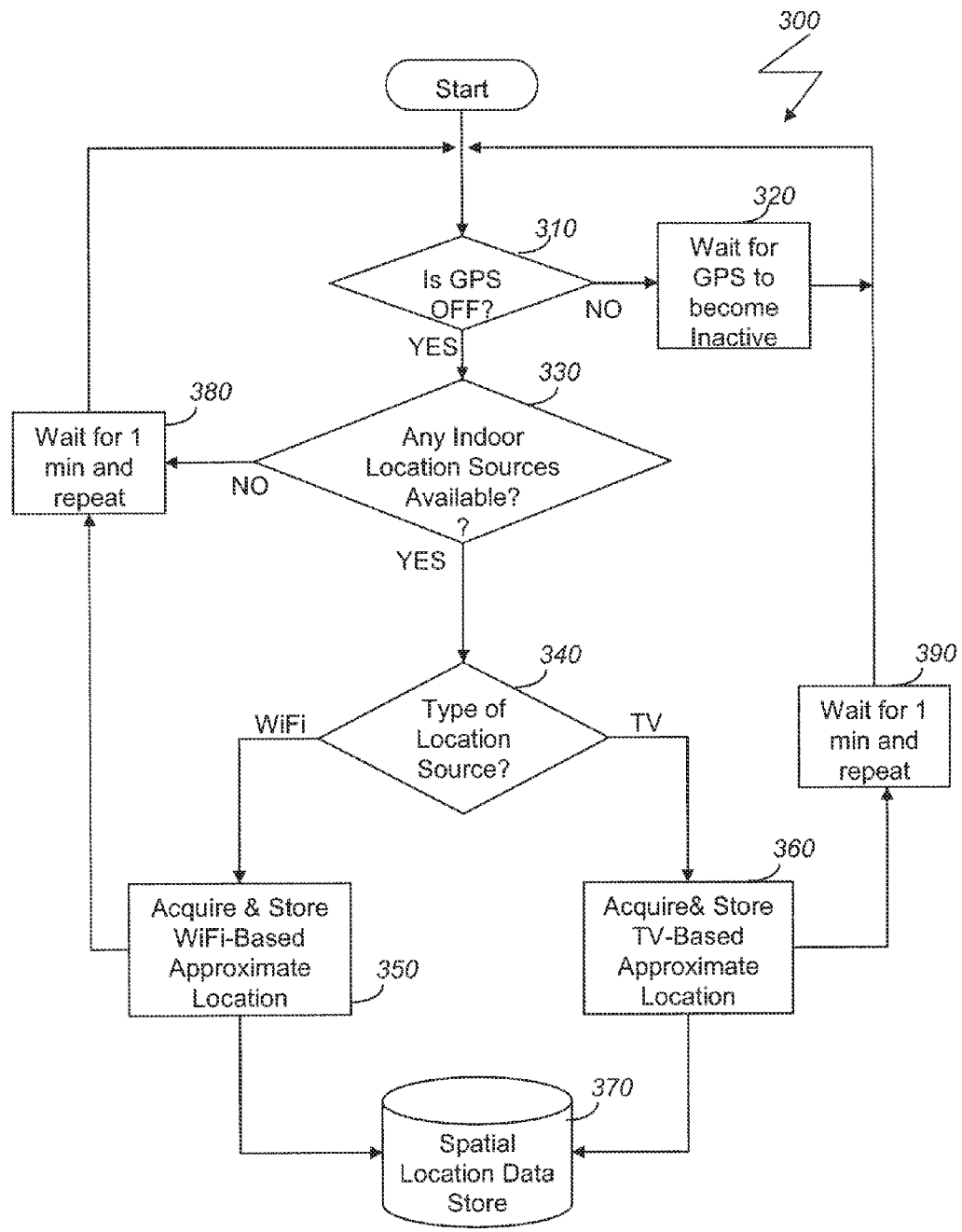
FIG. 4 is a flowchart illustrating a method for periodically acquiring pre-computed spatial location data in an MPC system, according to one embodiment.

FIG. 4 is a flowchart illustrating a method 300 for faster GPS location using pre-computed spatial location data for mobile platforms, in accordance with one embodiment. As shown in FIG. 4, deactivation of the UPS receiver due to, for example, entry into a building which includes a wireless network, enables indoor position calculation of a mobile platform according to know or compute locations of a predetermined number of access points or APs of the wireless network. In the embodiments described, examples of the described embodiments will be made with reference to FIGS. 1-3. However, the described embodiments should not be limited to the examples provided to limit the scope provided by the appended claims.

Referring again to FIG. 4, at process block 310, it is determined whether a GPS receiver is turned off. For example, the GPS receiver may be disabled or turned off in an effort to conserve power. In one embodiment, when the current spatial location of a mobile platform device or mobile personal computer, such as MPC system 100 of FIG. 1, is within a location that does not allow the receipt of a navigation message from a GPS satellite, the GPS receiver may be turned off. Otherwise, if a GPS receiver is enabled, at process block 320 a wait is initiated for deactivation of the GPS receiver. When the GPS receiver is enabled, and a required (predetermined) number of satellites are visible, the GPS receiver calculates the spatial location of the MPC and the GPS is active. At process block 320, the GPS is active, however, once the GPS becomes inactive due to deactivation of the GPS or movement of the user of the device, control flow returns to the start block.

Referring again to FIG. 4, at process block 330, it is determined whether a non-GPS based indoor location source is available. According to the embodiments described, an indoor location source is a non-GPS based location source and may include, but is not limited, to, Wi-Fi beacon based location, TV signal based location, precision location, and the like. When an indoor location source is available, control flow branches to process block 340 of FIG. 4. At process block 340, the type of the location source is determined. In one embodiment, a Wi-Fi beacon based location determines whether an AP beacon message is detected. When a Wi-Fi beacon based location is not detected, the pre-computed spatial location may be calculated using TV signals, as described above. At process block 360, the TV based spatial location is stored.

Referring again to FIG. 4, at process block 340, when a Wi-Fi beacon based location source is detected, at process block 340, logic (e.g., spatial location capture logic 280 of FIG. 3) may determine a location of one or more detected access points of a wireless network connection and computes an approximate spatial location of the MPD. At process block 370, the Wi-Fi based spatial location data is acquired and loaded within a data store. In one embodiment, the spatial location data is stored with a time stamp. In one embodiment, when an indoor location source is not detected at process block 330, a wait for a predetermined period is initiated and control flow returns to the start of method 300, as shown in FIG. 4.

Figure 5:
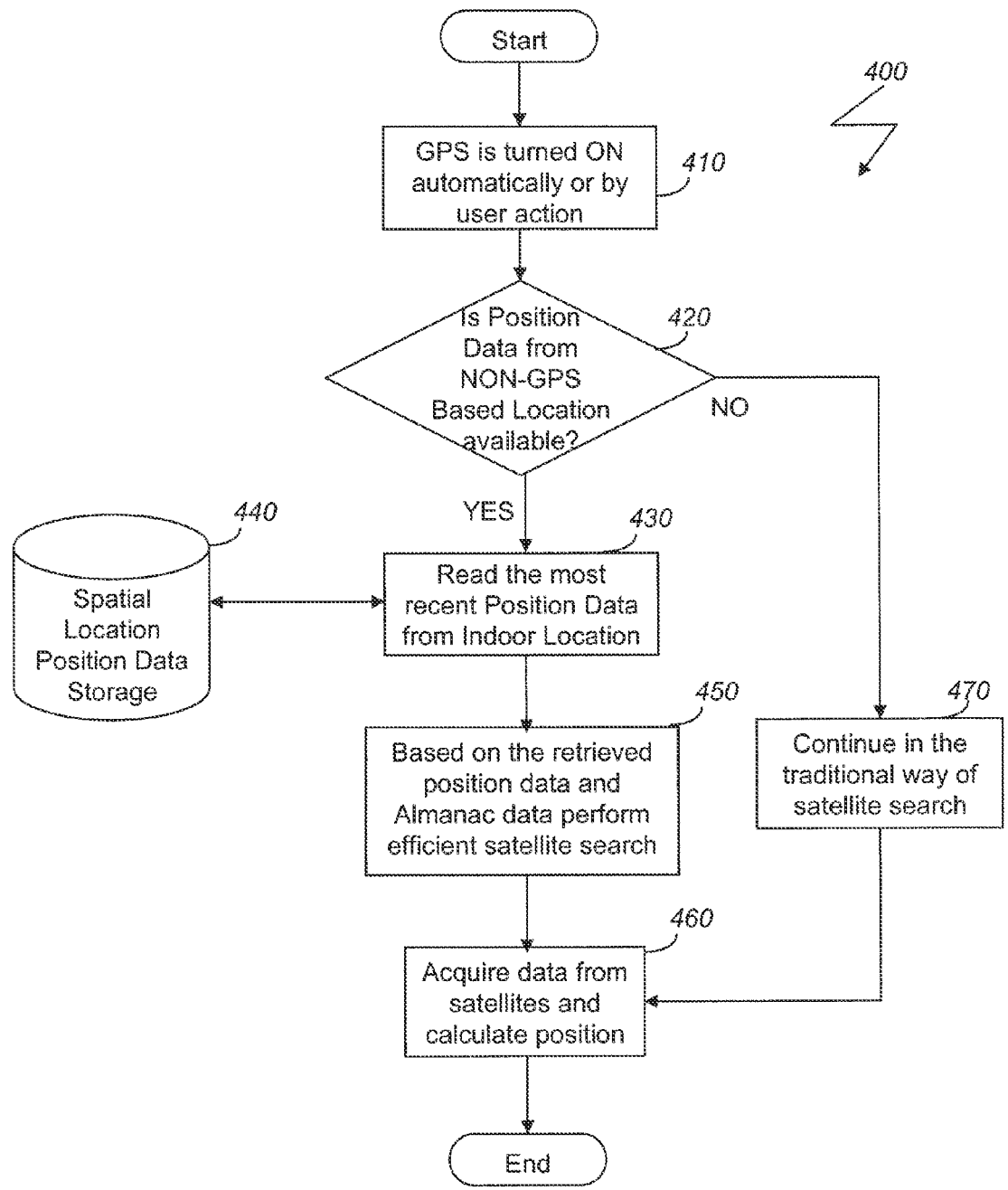
FIG. 5 is a flowchart illustrating a method for faster GPS location using a pre-computed spatial location for tracking GPS satellites, according to one embodiment.

FIG. 5 is a flow chart illustrating a method 400 for performing a faster, efficient satellite search. At process block 410, the GPS receiver is turned on. In one embodiment, activation of the GPS receivers triggers a "wake up event" that may be detected by spatial location logic 280 of FIG. 3. Once turned on at process block 420, it is determined whether spatial location data is available. Conventionally, when spatial location data is unavailable, at process block 470 GPS receiver continues the traditional GPS satellite search, which requires identification and lock onto a predetermined number of visible satellites required to perform position calculation.

Referring again to FIG. 5, at process block 430, a most recent position data from an indoor location (spatial location data) is read from a spatial location position data storage 440. At process block 450, based on the retrieved position data and almanac data, an efficient satellite search is performed by limiting the satellite search to visible overhead satellites detected according to almanac and retrieved position data. Likewise, at process block 460, data is acquired from visible satellites to perform position calculation with an order of magnitude improvement for a time to first fix compared to traditional GPS acquisition and position calculation.

In one embodiment, an efficient satellite search logic 240 performs the method 400, as shown in FIG. 5. In one embodiment, the efficient satellite search logic 240 using, for example, spatial location logic 280 may determine whether a beacon message, issued by an access point of a network connection, is detected to compute an approximate spatial location of the MPD.

Within an enterprise, one embodiment of MPD will use various indoor location technologies to provide a variety of location based services for the user as well as the IT department. Thus the mobile client knows its location when it is inside the building. When the user steps out of the building, the GPS might be automatically turned ON if user needs location based services. For example, the user might start using the mobile client when he gets into his car or public transport vehicle. Or the user might just walk to a coffee shop and start using the mobile client at the location. In addition, the user may use the mobile platform to act turn-by-turn navigation directions. Whatever may be the case, when the GPS is turned ON, the GPS software can first acquire the location that was calculated earlier when the MPD was inside the building. Considering that this location is frequently in close proximity, this last calculated location helps in determining what satellites may be visible overhead based on Almanac lookup. Now the GPS has to just look for only a few satellites that are really overhead in the sky and gets a lock on them quickly. In one embodiment, the position information from indoor location technology helps the GPS receiver on the mobile platform to perform a very efficient search which results in faster time to first fix and better user experience.

Figure 6:
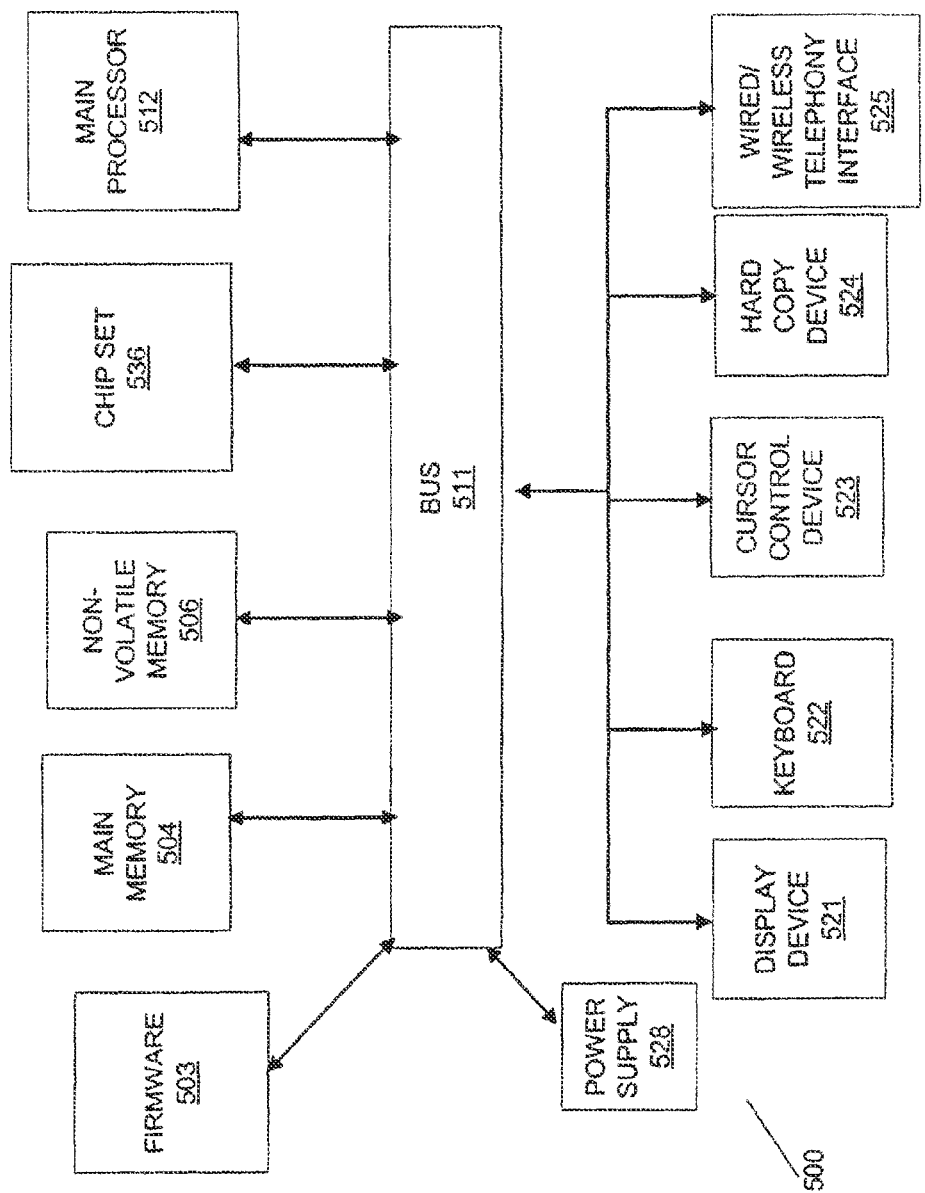
FIG. 6 is a block diagram illustrating a mobile platform architecture to provide a power efficient framework for faster UPS location using the pre-computed spatial location for tracking GPS satellites, according to one embodiment.

FIG. 6 illustrates a block diagram of an example computer system that may use an embodiment of faster GPS location using pre-computed spatial location data for mobile platforms computer, according to one embodiment. In one embodiment, computer system 500 comprises a communication mechanism or bus 508 for communicating information, and an integrated circuit component such as a main processing unit 502 coupled with bus 508 for processing information. One or more of the components or devices in the computer system 500 such as the main processing unit 602 or a chipset 610 may use an embodiment of the GPS management logic (GML) 200, as shown in FIG. 2. The main processing unit 502 may consist of one or more processor cores working together as a unit.

Computer system 500 further comprises a random access memory (RAM) or other dynamic storage device 515 (referred to as main memory) coupled to bus 508 for storing information and instructions to he executed by main processing unit 502. Main memory 615 also may be used for storing temporary variables or other intermediate information during execution of instructions by main processing unit 502.

Firmware 519 may be a combination of software and hardware, such as Electronically Programmable Read-Only memory (EPROM) that has the operations for the routine recorded on the EPROM. The firmware 519 may embed foundation code, basic input/output system code (BIOS), or other similar code. The firmware 519 may make it possible for the computer system 500 to boot itself.

Computer system 500 also comprises a read-only memory (ROM) and/or other static storage device 518 coupled to bus 508 for storing static information and instructions for main processing unit 502. The static storage device 518 may store OS level and application level software.

Computer system 500 may further be coupled to or have an integral display device 530, such as a cathode ray tube (CRT) or liquid crystal display (LCD), coupled to bus 508 for displaying information to a computer user. A chipset may interface with the display device 530.

An alphanumeric input device (keyboard) 532, including alphanumeric and other keys, may also be coupled to bus 508 for communicating information and command selections to main processing unit 502. An additional user input device is cursor control device 533, such as a mouse, trackball, trackpad, stylus, or cursor direction keys, coupled to bus 508 for communicating direction information and command selections to main processing unit 502, and for controlling cursor movement on a display device 530. A Chipset may interface with the input/output devices.

Another device that may be coupled to bus 508 is a power supply such as a battery and Alternating Current adapter circuit. Furthermore, a sound recording and playback device, such as a speaker and/or microphone (not shown) may optionally be coupled to bus 508 for audio interfacing with computer system 500. Another device that may he coupled to bus 508 is a wireless communication module 520. The wireless communication module 520 may employ a Wireless Application Protocol to establish a wireless communication channel. The wireless communication module 520 may implement a wireless networking standard, such as the 802.11 Standard.

As shown in FIG. 6, wireless communication device 520 may operate according to a wireless network protocol, such as, for example, the Institute of Electronic Engineers (IEEE) 802.11 Standard (e.g., IEEE Std. 802.11-1997, 802.11a, 802.11e, 802.11n, etc.). In one embodiment, wireless communications device may operate according to an 802.11 Standard for providing a mobile user with a connection to a local area network (LAN) through an radio frequency (RF) connection. However, it should be recognized that access to a wireless local area network (WLAN) is not limited to the 802.11 Standard, but may include Hyper-Lan2, as well as future potential standards for any point-to-point wireless link or network.

In one embodiment, wireless communication device 520 may provide support for a wireless network protocol for connection to a wireless wide area network (WWAN). In one embodiment, wireless communications device 520 may include virtual private network (VPN) logic 544 for automating access to a wireless network without user intervention.

In one embodiment, the software used to facilitate the routine can be embedded onto a machine-readable medium, A machine-readable medium includes any mechanism that provides (i.e., stores and/or transmits information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM) including firmware; random access memory (RAM); magnetic disk storage media; optical storage media; flash memory devices; etc.), as well as electrical, optical, acoustical or other form of propagated signals (e.g., carrier waves, infrared signals, digital signals, etc); etc.

Alternate Embodiments

It will be appreciated that, for other embodiments, a different system configuration may be used. For example, while the system 100 includes a single CPU 102, for other embodiments, a chip multiprocessor (CMP) system (where one or more processors cores may be similar in configuration and operation to the CPU 110 described above) may benefit from the faster GPS location using pre-computed spatial location data of various embodiments. Further different type of system or different type of computer system such as, for example, a server, a workstation, a desktop computer system, a gaming system, an embedded computer system, a blade server, etc., may be used for other embodiments.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments described may be downloaded as a computer program which may be transferred from a remote computer (e.g., a server to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. A method comprising:
    acquiring a pre-computed spatial location of a mobile platform device (MPD) when a global positioning system (GPS) receiver is disabled due to a spatial location of the MPD, wherein the spatial location is pre-computed periodically by a non-GPS based spatial location;
    in response to activation of the GPS receiver, providing spatial location data that includes the pre-computed spatial location to the GPS receiver; and
    identifying and locking onto a predetermined number of visible satellites based on the spatial location data and GPS almanac data to reduce a time to first fix (TTFF) for a current spatial location of the MPD, wherein a search by the GPS receiver for the predetermined number of visible satellites is limited to satellites that are visible over the pre-computed spatial location according to the GPS almanac data.

2. The method of claim 1, wherein acquiring the pre-computed spatial location comprises:
    determining whether a beacon message, issued by an access point of a wireless network connection is detected if the GPS receiver is disabled due to the spatial location of the MPD;
    determining a location of the access points of the wireless network connection;
    computing an approximate spatial location of the MPD if locations of a pre-determined number of detected access points are available; and
    storing the approximate spatial location.

3. The method of claim 1, wherein acquiring the pre-computed spatial location comprises:
    determining whether a synchronization signal, issued by a television tower, is detected if the GPS receiver is disabled due to the spatial location of the MPD;
    calculating an approximate spatial location of the MPD according to the synchronization signal; and
    storing the approximate spatial location.

4. The method of claim 1, wherein acquiring the pre-computed spatial location comprises:
    periodically determining whether an updated indoor spatial location is available using one or more non-GPS location technologies, wherein the updated indoor spatial location is one of a Wi-Fi beacon based location and TV signal based location.

5. The method of claim 1, wherein the non-GPS based spatial location source is a beacon based location source.

6. A method comprising:
    detecting, during a disabled state of a global positioning system (GPS) receiver, a wake up event;
    in response to the wake up event, retrieving spatial location data including a pre-computed spatial location acquired when the GPS receiver was disabled due to a spatial location of a mobile platform device (MPD), wherein the spatial location is pre-computed periodically by a non-GPS based spatial location source; and
    initiating a satellite search by the GPS receiver according to the pre-computed spatial location data for identification and lock onto a predetermined number of visible satellites to reduce a time to first fix (TTFF) a current spatial location of the MPD if the GPS receiver was in the disabled state for more than a predetermined period of time, wherein the satellite search is limited to satellites that are visible over the pre-computed spatial location according to the GPS almanac data.

7. The method of claim 6, wherein the pre-computed spatial location data is one of a Wi-Fi beacon based location and a television signal based location.

8. The method of claim 6, wherein the GPS receiver is issued a wake up event if a navigation message is received in a GPS signal from a GPS satellite.

9. The method of claim 6, where initiating the satellite search by the GPS receiver, further comprises:
    identifying satellites that are overhead and visible according to the almanac data and the pre-computed spatial location of the MPD indicated by the spatial location data;
    determining a location of each of the identified satellites according to ephemeris data;
    identifying and locking onto a pre-determined number of visible satellites; and establishing a current spatial location of the MPD according to a distance between the GPS receiver and each of the predetermined number of visible satellites.

10. An article of manufacture having a machine-readable storage medium encoded with data, wherein the data, when accessed by a machine, results in machine performing operations comprising:
  detecting deactivation of a global positioning system (GPS) receiver due to user movement of a mobile platform device (MPD);
  if the GPS receiver is in a disabled state for more than a predetermined period of time, acquiring a pre-computed spatial location that is computed periodically by a non-GPS location source while the GPS receiver is disabled;
  in response to activation of the GPS receiver, providing spatial location data that includes the pre-computed spatial location to the GPS receiver to expedite a satellite search by the GPS receiver if the GPS receiver was in the disabled state for more than the predetermined period of time; and
  identifying and locking onto a predetermined number of visible satellites based on the spatial location data and GPS almanac data to reduce a time to first fix (TTFF) for a current spatial location of the MPD, wherein a search for the predetermined number of visible satellites is limited to satellites that are visible over the pre-computed spatial location according to the GPS almanac data.

11. The article of manufacture of claim 10, wherein the non-GPS location source is a beacon based location according to a predetermined location of one or more detected access points for one or more wireless network connections.

12. The article of manufacture of claim 10, wherein the non-GPS location source is a television signal based location using a synchronization signal issued by a television tower.

13. A system comprising:
  a chip including:
    a global positioning system (GPS) receiver to establish a current spatial location of a mobile platform device (MPD), and
    a management logic including satellite search logic to acquire a pre-computed spatial location of a mobile platform device (MPD) that is computed when the GPS receiver is deactivated, wherein the pre-computed spatial location is computed periodically by a non-GPS based spatial location source while the GPS receiver is disabled;
  wherein the satellite search logic is to initiate a satellite search by providing the pre-computed spatial location to the GPS receiver in response to activation of the GPS receiver;
  wherein the GPS receiver is to identify and lock onto a predetermined number of visible satellites based on the spatial location data and GPS almanac data to reduce a time to first fix (TTFF) for a current spatial location of the MPD, wherein a search by the GPS receiver for the predetermined number of visible satellites is limited to satellites that are visible over the pre-computed spatial location according to the GPS almanac data.

14. The system of claim 13, wherein the management logic further comprises:
  spatial location data logic to compute an approximate spatial location of the MPD using an indoor spatial location, and to store the approximate spatial location to provide the pre-computed spatial location when the GPS receiver is disabled due to a spatial location of the MPD.

15. The system of claim 13, further comprising:
  a communications interface, coupled to the GPS receiver, to communicate with an access point of a network; and
  a direct current (DC) power source, wherein the DC power source couples to the chip.

16. The system of claim 13, wherein the non-GPS based spatial location source is one of a Wi-Fi beacon based location source and a TV signal based location source.

17. The system of claim 13, wherein the satellite search logic is further to periodically determine whether an updated indoor spatial location is available, wherein the updated indoor spatial location is one of a Wi-Fi beacon based location and TV signal based location.

18. The method of claim 1, wherein the spatial location is computed more frequently at a first time of day and less frequently at a second time of day.

19. The method of claim 7, wherein acquiring a spatial location includes:
  acquiring the spatial location from the Wi-Fi beacon if a signal from the Wi-Fi beacon is detected, or
  acquiring the spatial location from the television signal if a signal from the wireless network is not detected.

* * * * *